United States Patent
Borzuta (12) 
(10) Patent No.: US 6,228,406 B1
(45) Date of Patent: May 8, 2001

(54) PROCESS FOR ISOLATING FILLING FROM OUTER EDIBLE SHELL MEMBER

(76) Inventor: Anna Borzuta, 7083 N. Caldwell Ave., Chicago, IL (US) 60646

( * ) Notice: Subject to any disclaimer, the term of this patent is extended or adjusted under 35 U.S.C. 154(b) by 0 days.

(21) Appl. No.: 09/374,835

(22) Filed: Aug. 14, 1999

(51) Int. Cl.$^7$ ............................ B65B 25/22; B65B 29/00; B65B 29/08
(52) U.S. Cl. ........................ 426/284; 426/113; 426/115; 426/120; 426/281; 426/282; 426/283; 426/394; 426/395; 426/412; 426/420
(58) Field of Search .......................... 426/90, 120, 115, 426/94, 420, 394, 412, 282–284, 395, 118

(56) References Cited

U.S. PATENT DOCUMENTS

| | | | |
|---|---|---|---|
| 2,186,435 | * | 1/1940 | Serr ........................................ 426/120 |
| 2,240,522 | * | 5/1941 | Serr . |
| 2,359,881 | | 10/1944 | Serr . |
| 2,360,597 | * | 10/1944 | Topolski ............................... 426/123 |
| 2,467,875 | * | 4/1949 | Andrews ............................... 426/123 |
| 2,596,620 | * | 5/1952 | Townsend ............................. 426/122 |
| 2,819,738 | * | 1/1958 | Marberg . |
| 2,926,833 | * | 3/1960 | Engleson et al. ..................... 426/123 |
| 3,008,835 | * | 11/1961 | Madding .............................. 426/120 |
| 3,043,424 | * | 7/1962 | Howard . |
| 3,797,646 | * | 3/1974 | Horne . |
| 3,867,559 | | 2/1975 | Hans . |
| 4,721,622 | | 1/1988 | Kingham et al. . |
| 5,094,863 | * | 3/1992 | Vandenburg .......................... 426/123 |
| 5,332,586 | * | 7/1994 | Dimino ................................. 426/122 |
| 5,489,658 | * | 2/1996 | Huang ................................... 426/122 |
| 5,567,455 | | 10/1996 | Alsbrook, Sr. . |

FOREIGN PATENT DOCUMENTS

| | | | |
|---|---|---|---|
| 2252533 | * | 11/1997 | (CA) . |
| 4117093 | * | 11/1992 | (DE) . |
| 612476 | * | 8/1994 | (EP) . |
| 2203927 | * | 11/1988 | (GB) .................................... 426/115 |
| 4-112751 | * | 4/1992 | (JP) . |
| 5-95761 | * | 4/1993 | (JP) . |
| WO97/40693 | * | 11/1997 | (WO) . |

OTHER PUBLICATIONS

Wiley Encyclopedia of Packaging Technology pp. 185, 196, (Bakker–Editor) J. Wiley & Sons, 1986.*

* cited by examiner

Primary Examiner—Steven Weinstein
(74) Attorney, Agent, or Firm—Michael I. Kroll (57) ABSTRACT

The present invention discloses an impervious inner jacket 16 which may contain an inner edible foodstuff 14 which is encircled by an outer foodstuff 12. The inner jacket 16 has one end which may be equipped with a tear stripe 20 or tie member 28 which provides a means for removing the inner foodstuff 14 from the outerjacket 12. The jacket 16 has a tab 18 on one end which can be grasped by the fingers 38 of the user to help remove the jacket 16 from inside the outer foodstuff 12.

1 Claim, 12 Drawing Sheets

PROCESS FOR ISOLATING FILLING FROM OUTER EDIBLE SHELL MEMBER

BACKGROUND OF THE INVENTION

1. Field of the Invention

The present invention relates generally to foodstuffs and, more specifically, to foodstuffs having an outer member comprised of any edible foodstuffs which can form an outer shell. Said outer shell is separated from any foodstuffs which can form an edible inner member. Said inner member being further contained within a packaging material having one sealed end and one open end where through the inner edible member is inserted whereupon said packaging material being substantially comprised of a moisture impermeable material is sealed forming a hermetically sealed container which will extend the original composition shelf life. Further the preferred embodiment of the present invention having a tear strip provides means for venting the moisture laden inner edible material while it is being heated.

In addition, the inner member foodstuffs can be substantially deposited within said outer member by compressing the packaging material while pulling the packaging material by the supplied tab portion of the packaging material.

2. Description of the Prior Art

There are other filling and filler devices designed for inserting and separating an inner and outer foodstuff. Typical of these is U.S. Pat. No. 4,721,622 issued to Kingham et al. on Jan. 26, 1998.

Another patent was issued to Alsbrook Sr. on Oct. 22, 1996 as U.S. Pat. No. 5,567,455. Yet another U.S. Pat. No. 3,867,559 was issued to Haas on Feb. 18, 1975 and still yet another was issued on Jul. 8, 1941 to Seer as U.S. Pat. No. 2,359,881.

U.S. Pat. No. 4,721,622

Inventor: Clive G. Kinghain, et al.

Issued: Jan. 26, 1988

A snack food product comprises a filling (107) wholly enclosed in a bread-like casing (100), optionally with a barrier layer (106) disposed between the casing (100) and the filling (107). A sterile moisture-proof wrapping (108) wholly encloses the edible part (100, 106, 107) of the product. The snack food product (100, 106, 107, 108) is storable at normal temperature for long periods, e.g. several months. The product can be made by assembling the components before or after a shaped dough component is baked to form the bread-like casing (100) and can be prepared for consumption by a heating step carried out before or after the edible part (100, 106, 107) is removed from the wrapping (108).

U.S. Pat. No. 5,567,455

Inventor: William N. Alsbrook, Sr.

Issued: Oct. 22, 1996

This invention comprises a salad sandwich and method of making the same where the salad sandwich is made of a baked edible shell that is open at one end and contains a tear-away bag which is filled with an appropriate sandwich fill. The tear-away bag keeps the sandwich fill fresh and prevents the sandwich fill from transferring moisture to the shell. The tear-away bag has a tear-away mechanism which, just before the salad sandwich is eaten, allows the bag to be removed in one step without removing the sandwich fill from the confines of the shell.

U.S. Pat. No. 3,867,559

Inventor: Franz Haas

Issued: Feb. 18, 1975

A method and apparatus for producing tubular waffle shapes from a strip of waffle material wound helically on a mandrel in edgewise overlapping relationship, and contacted by steam before overlapping to adhesively bind the adjacent convolutions. The overlapping edges are pressed together by a guide roller to assure good adhesion and the tubular waffle shape is completely filled with a creamy substance and is cut into predetermined lengths before hardening.

U.S. Pat. No. 2,359,881

Inventor: William F. Serr

Issued: Jul. 8, 1941

This United States patent discloses a coring machine suitable for making core holes in food products having a cutting element comprising an outer cutting tube having a sharpened edge and a screw conveyor rotatable in opposite directions. Suitable pulleys or other driving devices are secured to said cutting tube and conveyor respectively, which devices may be mounted upon a suitable driving head or support mounted upon a base or table. The base or table may also have a longitudinal guideway on which is slidably mounted a carrier or holder for supporting the frankfurter or other food product, and upon which the food product is caused to move longitudinally of the cutting element to remove the core therefrom.

While these other filling and filler devices designed for inserting and separating an inner and outer foodstuff may be suitable for the purposes for which they were designed, they would not be as suitable for the purposes of the present invention, as hereinafter described.

SUMMARY OF THE PRESENT INVENTION

The present invention discloses an impervious inner jacket which may contain an inner edible foodstuff both of which are encircled by an outer foodstuff. The inner jacket has one end which may be equipped with a tear stripe or tie member which provides a means for removing the inner foodstuff from the inner jacket. The jacket has a tab on one end which can be grasped by the lingers of the user to help remove the jacket from inside the outer foodstuff.

A primary object of the present invention is to provide foodstuffs having an outer shell member and an inner filler member being separated from each other until being selectively consumed.

Another object of the present invention is to provide foodstuffs having an outer shell member and an inner filler member being separated from each other by a removable sealed packaging member which will be selectively removed at time of consumption of said foodstuff;

Yet another object of the present invention is to provide foodstuffs having an outer shell member and an inner filler member being separated from each other by a removable sealed packaging member which will be selectively removed at time of consumption of said foodstuff by squeezing the closed end of said packaging member while pulling on said member;

Additional objects of the present invention will appear as the description proceeds.

The present invention overcomes the shortcomings of the prior art by providing foodstuffs having an outer member comprised of any edible foodstuffs which can form an outer shell. Said outer shell is separated from any foodstuffs formed as an inner member comprised of any edible foodstuffs which can form an edible inner member. Said inner member being further contained within a packaging material having one sealed end and the other end being removably or selectively closed whereby when opened the inner member foodstuffs can be substantially deposited within said outer member by squeezing while pulling the packaging material separating said inner and said outer foodstuffs.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 outer food
13 joinder
14 inner food
16 jacket
18 tab
20 tear strip
22 end of jacket
24 main body of jacket
26 tear string
28 tie member
30 scoring
32 filling
34 liquid
36 closed end of jacket
38 fingers of user
40 open end
42 closure strip
44 end portion

DESCRIPTION OF THE PREFERRED EMBODIMENT(S)

In order that the invention may be more fully understood, it will now be described, by way of example, with reference to the accompanying drawings in which FIGS. 1 through 7B illustrate the present invention being a process for sealing and isolating an inner foodstuff from an outer edible shell of foodstuff.

Figure 1:
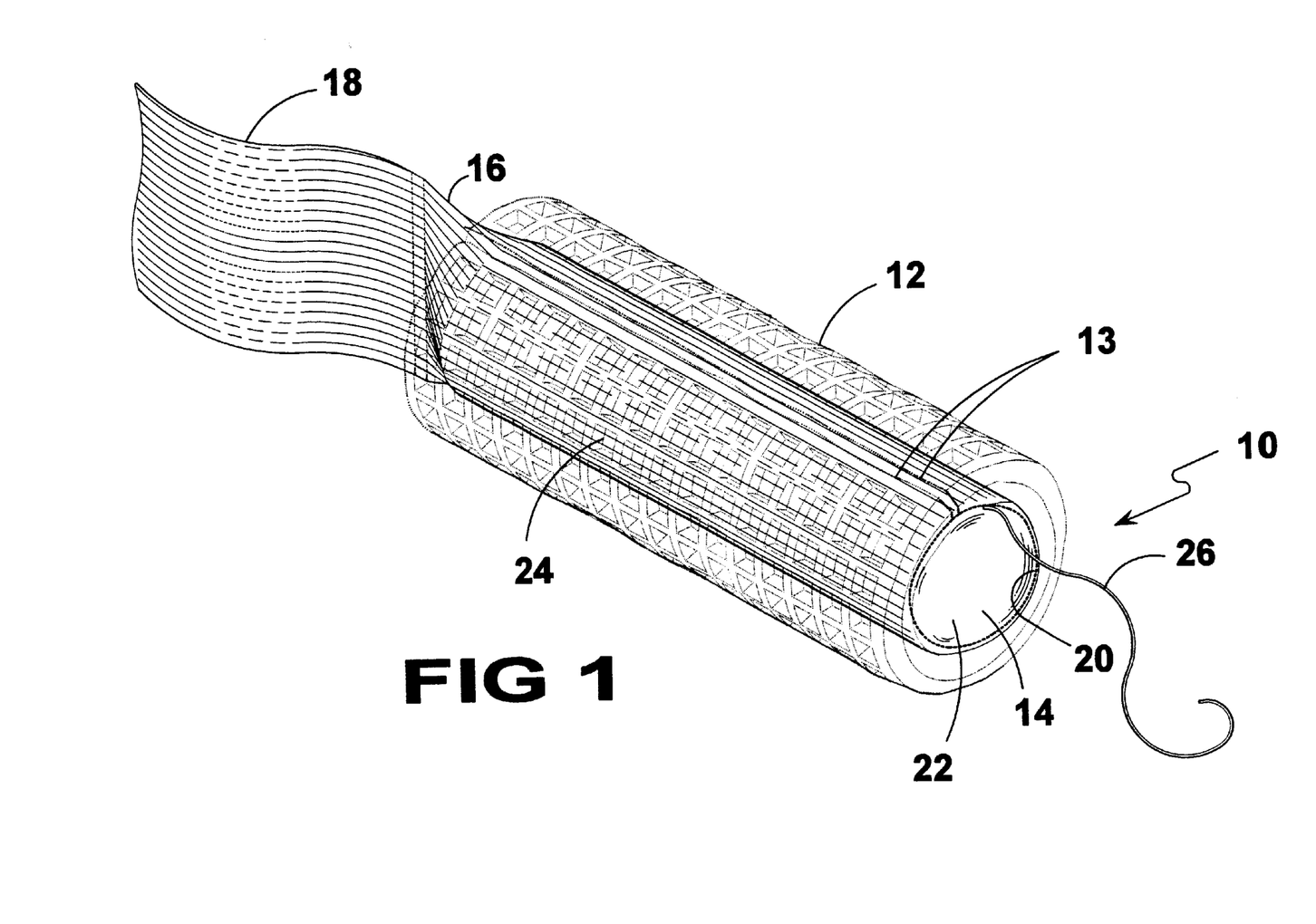
FIG. 1 is a perspective view of the present invention. Shown is a food item having an outer edible member, shown in outline, having an inner edible member enclosed within a moisture impermeable selectively removable jacket having a tab providing means for pulling the moisture impermeable removable jacket from the food item. Also shown is a tear strip which provides means for removing one distal end of the jacket before removing the main body portion of the jacket.

Turning to FIG. 1, shown therein is a perspective view of the present invention 10. Shown is a food item 10 having an encircling outer edible member 12 joining to itself fat 13, shown in outline, having an inner edible member 14 enclosed within a moisture impermeable selectively removable jacket 16 having a tab 18 on one end providing means for pulling the moisture impermeable removable jacket 16 from the food item 12. Also shown is a circular tear strip 20 with tear string 26 which provides means for removing one distal end 22 of the jacket 16 before removing the main body portion 24 of the jacket 16 encircled by outer member 12.

Figure 1A:
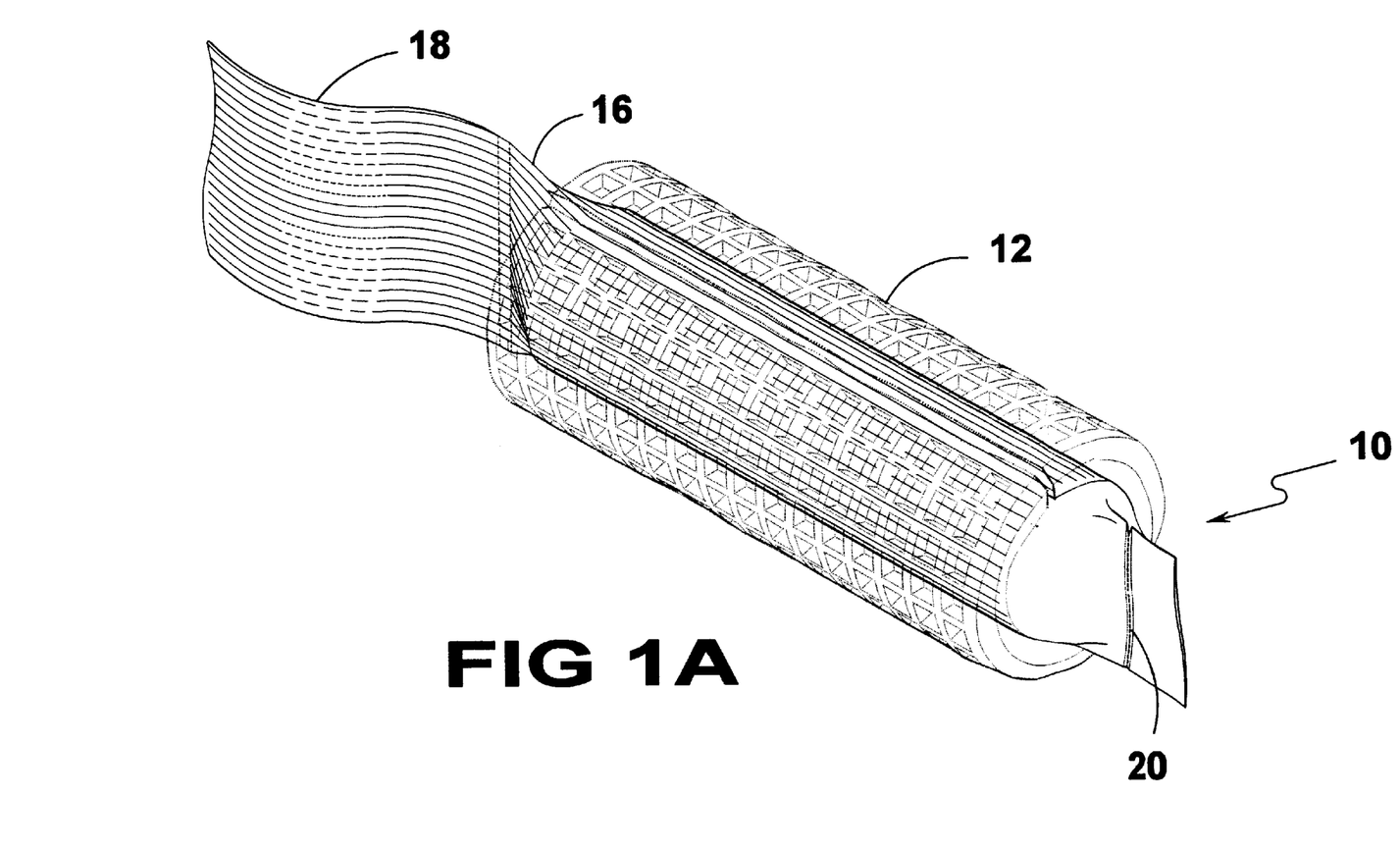
FIG. 1A is another embodiment of the moisture impermeable selectively removable jacket having a tear strip providing means for breaking the seal on the jacket whereby the jacket can be selective removable.

Turning to FIG. 1A, shown therein is another embodiment of the present invention 10 showing a moisture impermeable selectively removable jacket 16 having a tear strip 20 providing means for breaking the seal on the jacket 16 whereby the jacket can be selective removable and openable.

Figure 1B:
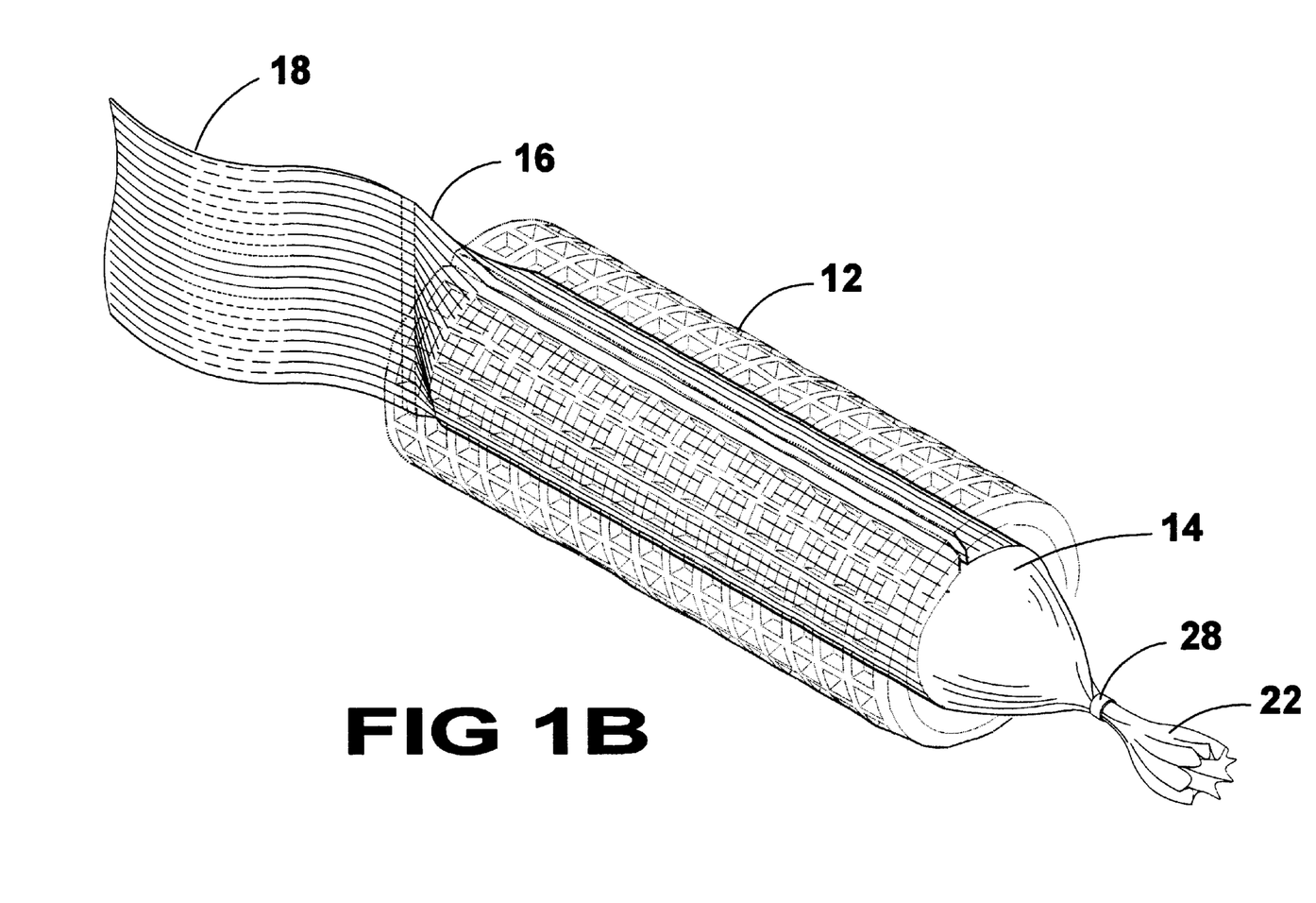
FIG. 1B is an additional embodiment of the moisture impermeable selectively removable jacket having a crimp or tie member sealing one distal end and a tab on the other distal end for removing the jacket from between the edible members.

Turning to FIG. 1B, shown therein is an additional embodiment of the moisture impermeable selectively removable jacket 16 having a crimp or tie member 28 sealing one distal end 22 and a tab 18 on the other distal end for removing the jacket 16 from between the edible members 12 and 14 (not visible).

Figure 1C:
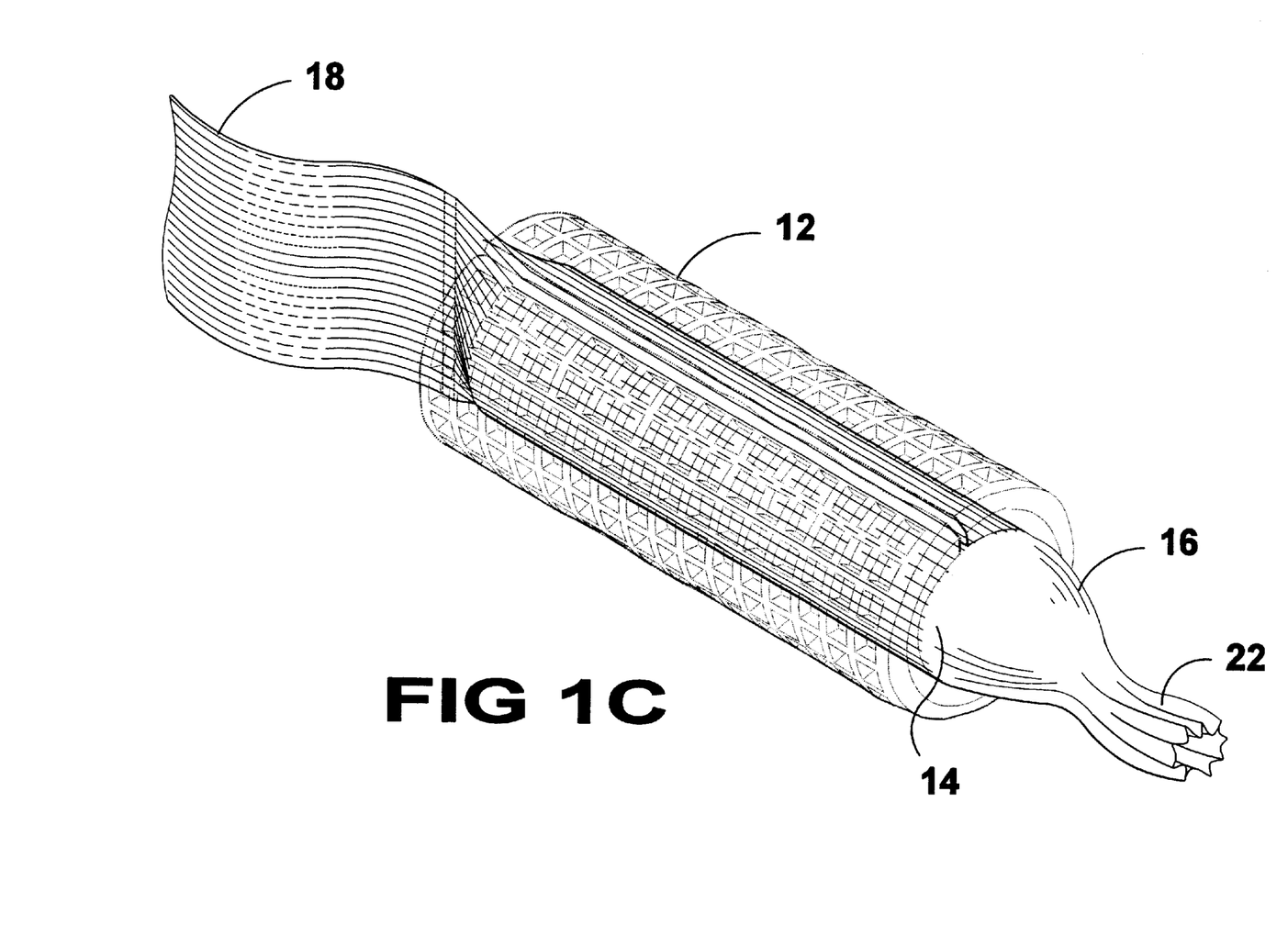
FIG. 1C is an additional view of the embodiment shown in FIG. 1B having the crimp or tie member removed permitting the moisture impermeable jacket to be removed by pulling on the tab end of the jacket. Therein separating the jacket from the edible members.

Turning to FIG. 1C, shown therein is an additional view of the embodiment shown in FIG. 1B having the crimp or tie member 28 (not shown) removed permitting the moisture impermeable jacket 16 to be removed by pulling on the exposed tab end 18 of the jacket 16, thereby separating the jacket 16 from the edible members 12 and 14 (not visible).

Figure 2:
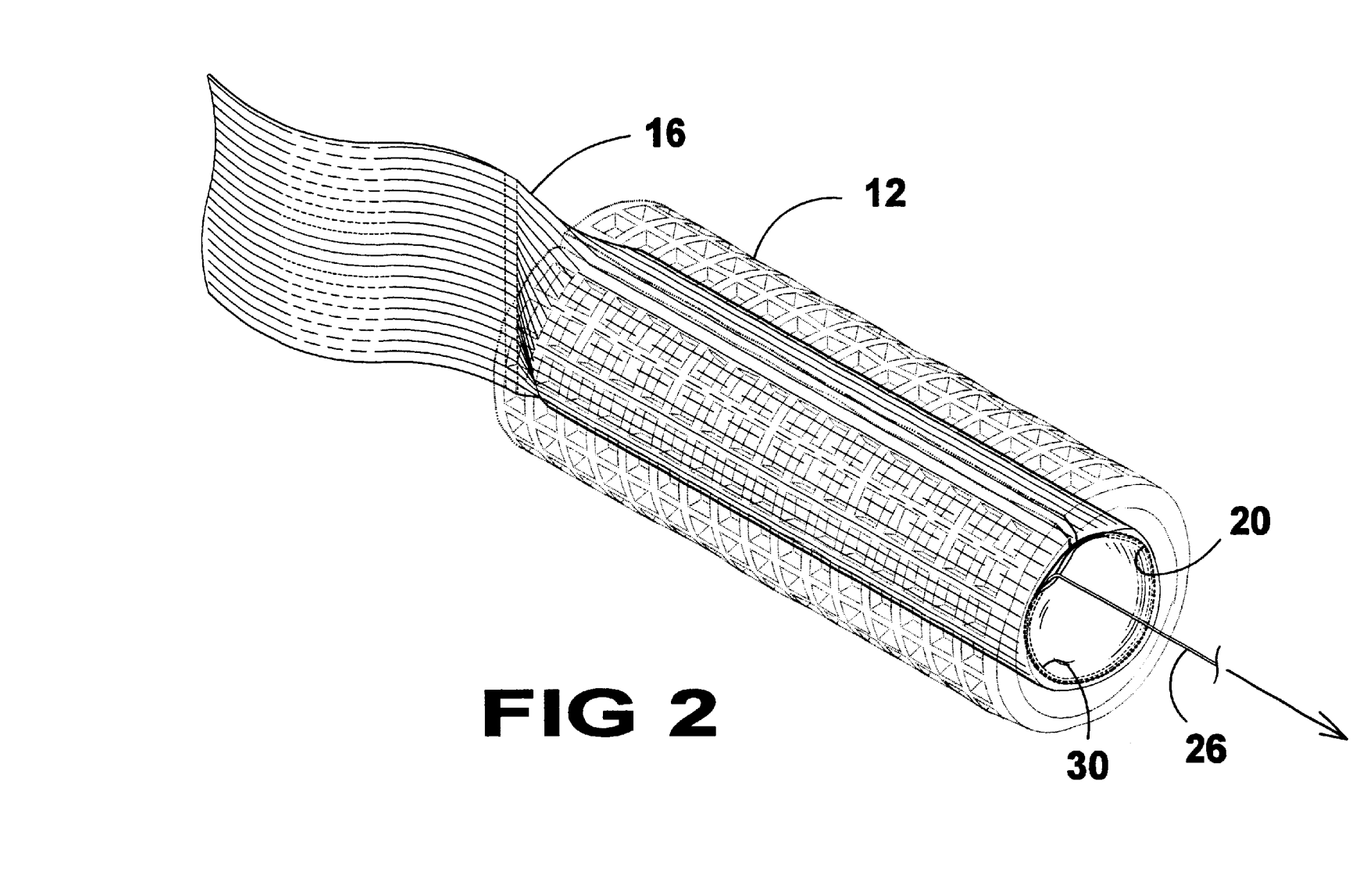
FIG. 2 is a view of the embodiment shown in FIG. 1 having the tear strip forming an integral part of a circumferential perforation-like scoring on the jacket which will cause one end of the jacket to separate easily from the body of the moisture impermeable selectively removable and therein provide means for removal of the remainder of the jacket.

Turning to FIG. 2, shown therein is a view of the embodiment shown in FIG. 1 having the tear strip 20 and string 26 forming an integral part of a circumferential perforation-like scoring 30 on the jacket 16 which will cause one end of the jacket 16 to separate easily from the body of the moisture impermeable selectively removable jacket 16 and thereby provide means for removal of the remainder of the jacket 16.

Figure 3:
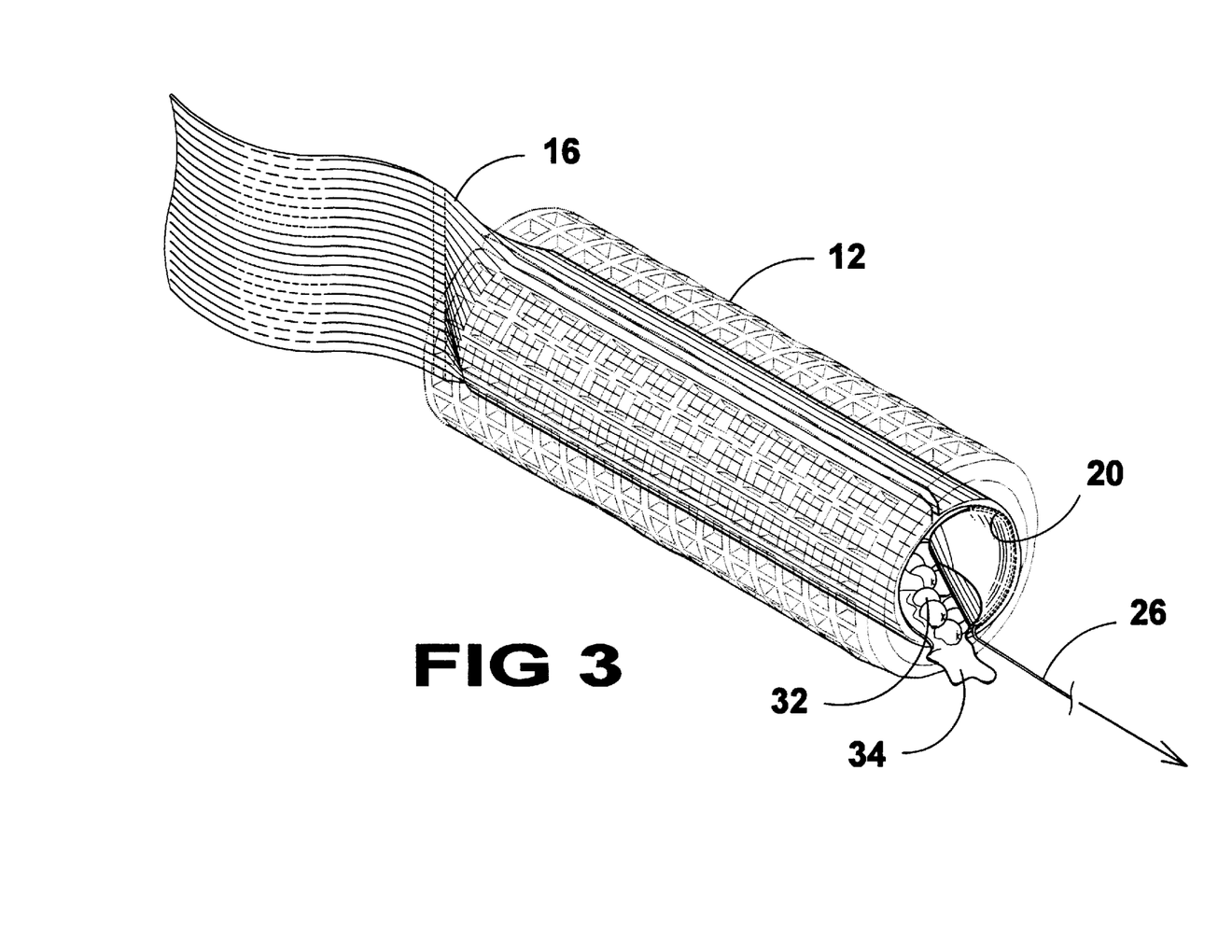
FIG. 3 is further view of the removal of the tear strip of the moisture impermeable jacket. Shown is a filling which having a liquid content will be preserved in its original package form until selectively opened by a user.

Turning to FIG. 3, shown therein is a further view of the removal of the tear strip 20 with string 26 of the moisture impermeable jacket 16. Shown is a filling 32 which having a liquid content 34 will be preserved in its original package form until selectively opened by a user.

Figure 4:
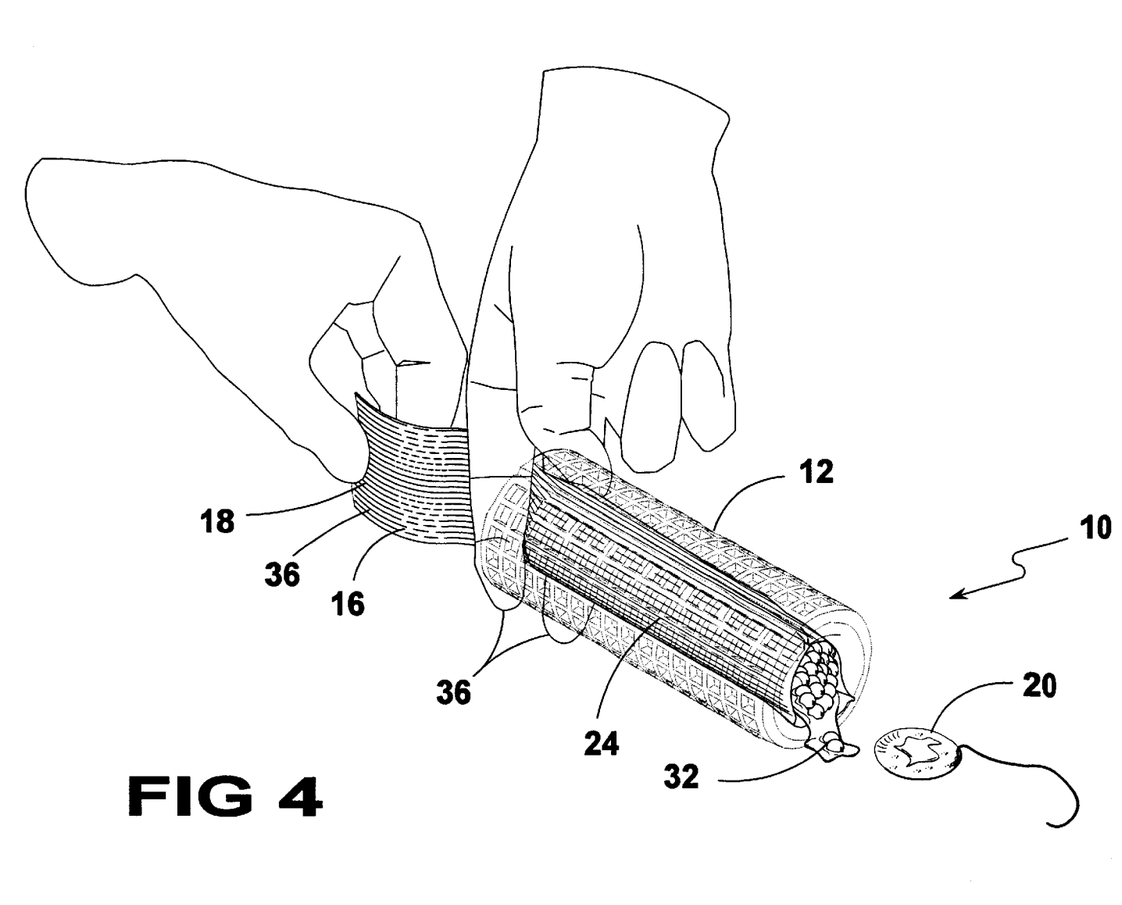
FIG. 4 is a further view of the moisture impermeable jacket of the present invention. The jacket having the tear strip removed provides means for removal of the remainder of tile jacket by lightly compressing the jacket at the closed end and pulling the remainder of the jacket through said compression by the tab.

Turning to FIG. 4, shown therein is a further view of the moisture impermeable jacket 16 of the present invention 10. The jacket 16 having the tear strip 20 removed provides means for removal of the remainder of the jacket 24 by lightly compressing the jacket between or with the fingers 38 of the user near the closed end 36 and pulling the remainder of the jacket 24 through the compressed fingers 38 by the tab 18.

Figure 5:
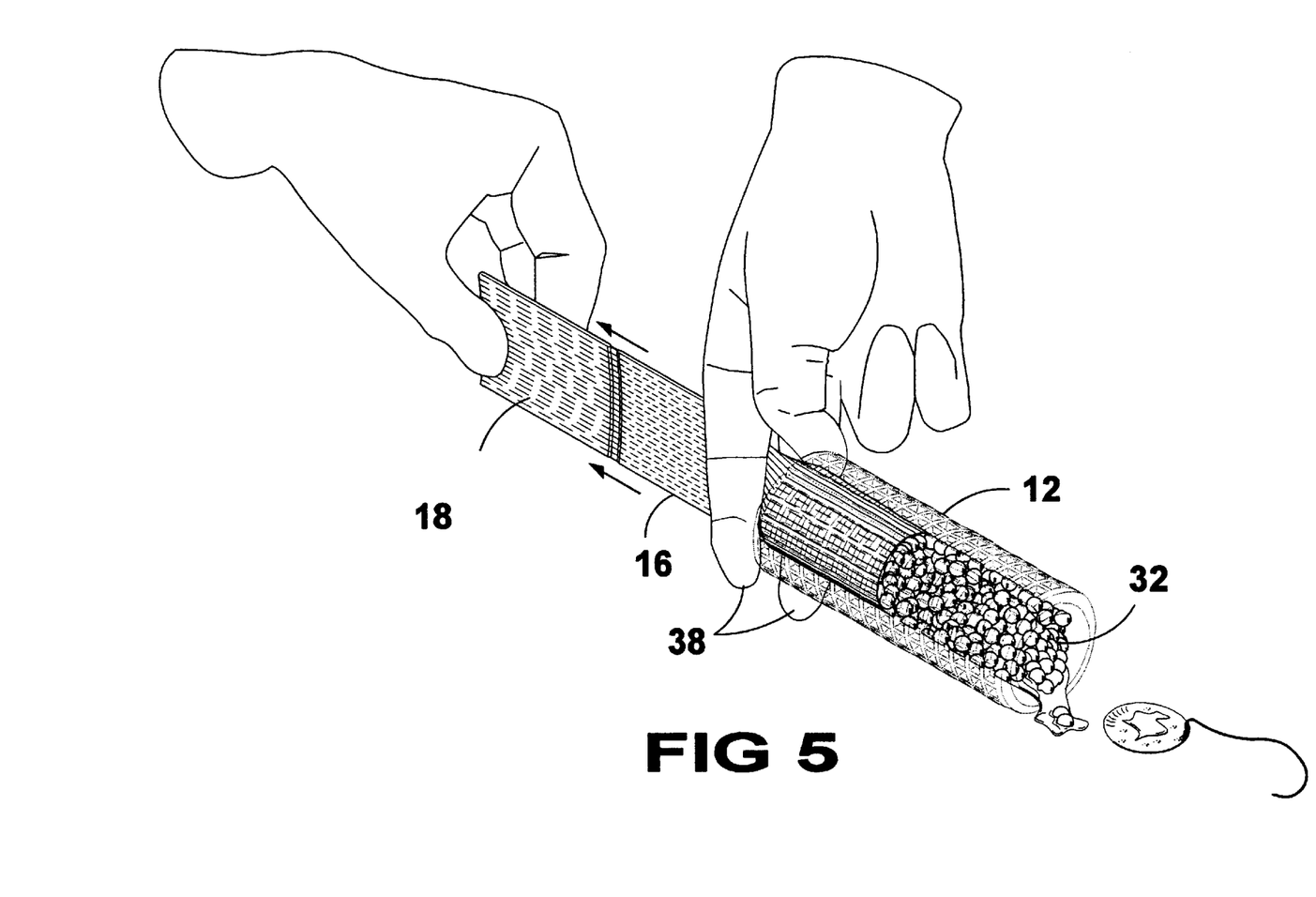
FIG. 5 is a continuation of the removal or the moisture impermeable jacket as shown in FIG. 4. The remainder of the jacket is removed by pulling on the tab while compressing the jacket between the fingers. The edible filling will remain positioned within the outer edible member as the non-edible moisture impermeable jacket is removed which results in a freshly packaged product appearance having a crisp outer member and a moist inner member.

Turning to FIG. 5, shown therein is a continuation of the removal of the moisture impermeable jacket 16 as shown in FIG. 4. The remainder of the jacket 16 is removed by pulling on the tab 18 while compressing the jacket between the fingers 38. The edible filling 32 will remain positioned within the outer edible member 12 as the non-edible moisture impermeable jacket 16 is removed which results in a fleshly packaged product appearance having a crisp outer member 12 and a moist inner member 32.

Figure 6:
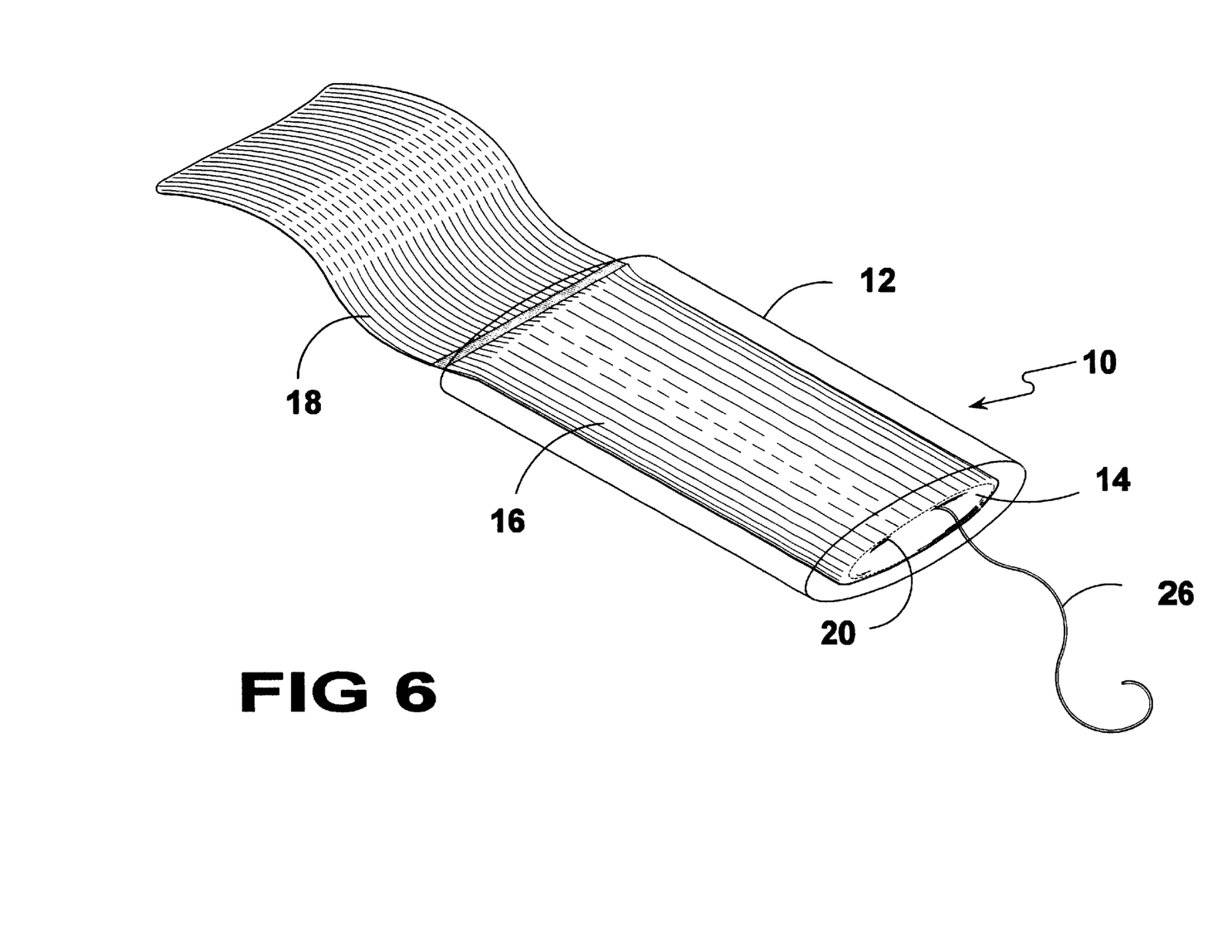
FIG. 6 is another view of a food item having an outer edible member having an inner edible member hermetically sealed within a moisture impermeable jacket having a tab extending portion and a tear strip member which provides means for breach the jacket. This configuration also provides means for inserting said food item into a microwave or other heating appliance. The user would breach the jacket by breaking the seal of the jacket by pulling the tear strip which creates a steam vent. The food item would be inserted into a heating appliance and selectively heated. After removal from the heating appliance the tear strip would be removed along with the remainder of the jacket providing a food item having a crisp outer member and a heated filling member.

Turning to FIG. 6 shown therein is another view of a food item 10 having an outer edible member 12 having an inner edible member 14 hermetically sealed within a moisture impermeable jacket 16 having a tab extending portion 18 and a tear strip member 20 with tear string 26 which provides means for breaching the jacket 16. This configuration also provides means for inserting the food item 10 into a microwave or other heating appliance. The user would breach the jacket 16 by breaking the seal of the jacket by pulling the tear strip string 26 which creates a steam vent (not shown). The food item would be inserted into a heating appliance and selectively heated. After removal from the heating appliance the tear strip 20 would be removed along with the remainder of the jacket 16 as previously explained providing a food item having a crisp outer member 12 and a heated filling member 14.

Figure 7:
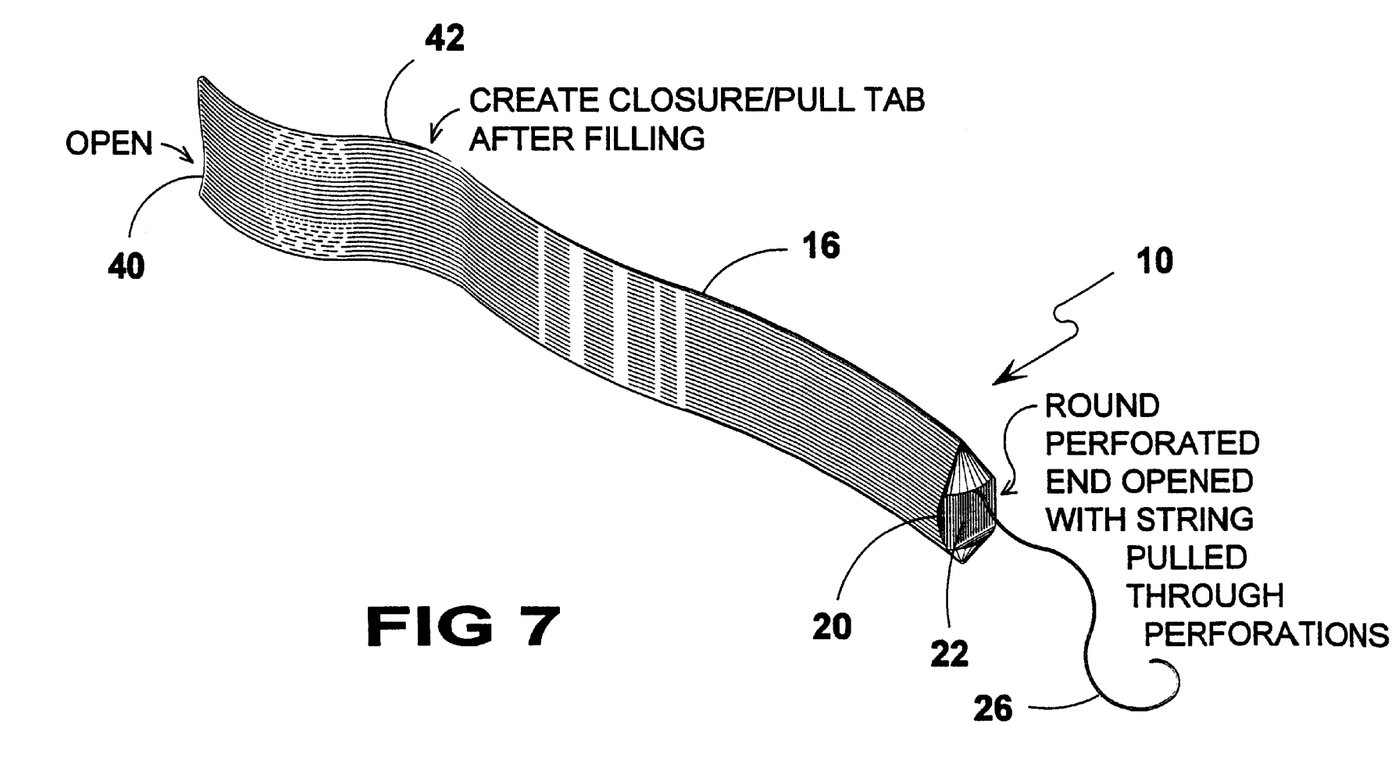
FIG. 7 is a perspective view of the preferred embodiment of the present invention. Shown is a tube-like container being closed at one end by a selectively removable tear strip and being open at the other end which will be sealed after inserting an edible food item therein. Thereby providing a hermetically sealed perishable food container having a variable moisture content, which can be inserted into and encompassed by an outer edible member or said tube-like container can be filled after being encompassed by the outer edible member.

Turning to FIG. 7, shown therein is a perspective view of the preferred embodiment of the present invention 10. Shown is a tube-like container jacket 16 being closed at one end 22 by a selectively removable tear strip 20 and string 26 and being open at tile other end 40 which open end will be sealed to create a closure stripe 42 after inserting an edible food item (not shown) therein. Thereby provided is a hermetically sealed perishable food container having a variable moisture content, which can be inserted into and encompassed by an outer edible member 12 (not shown) or said tube-like container 16 can be filled after being encompassed by the outer edible member.

Figure 7A:
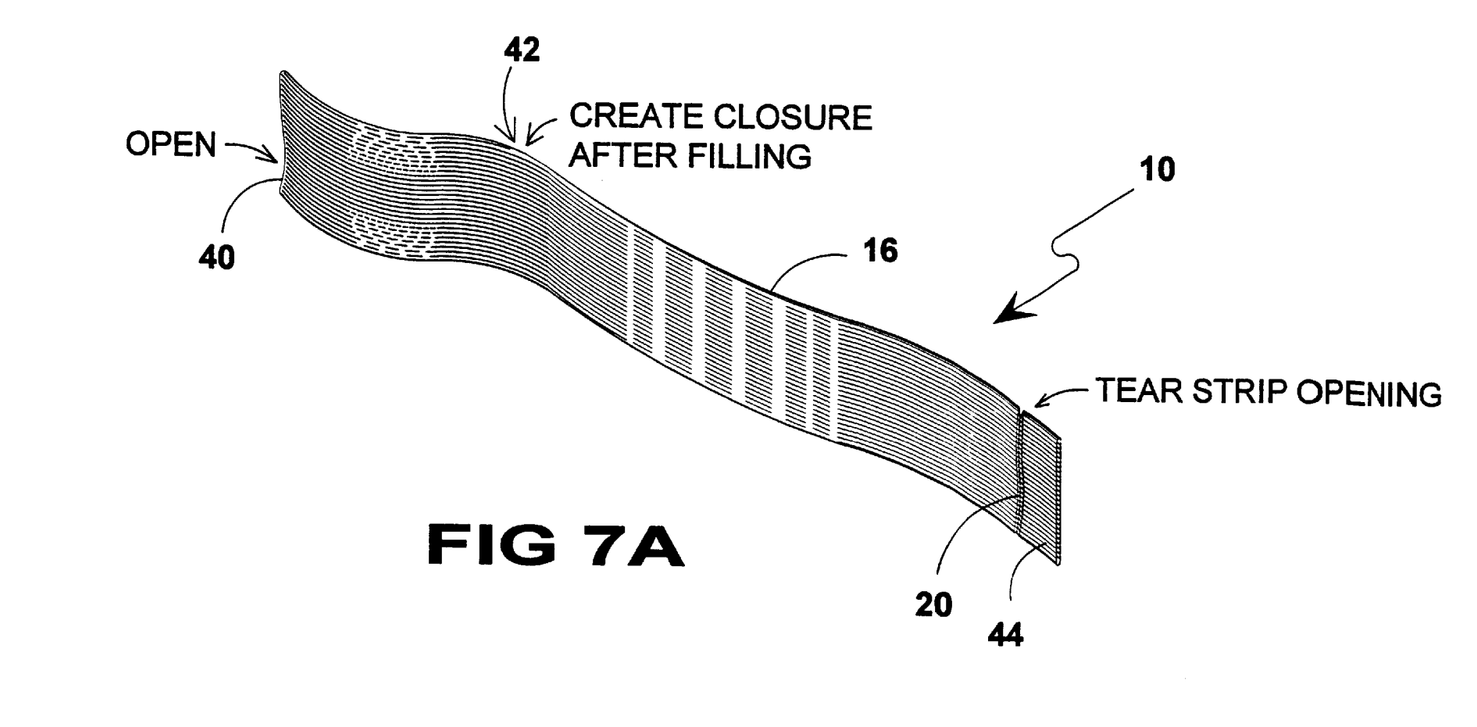
FIG. 7A is a perspective view of an additional embodiment of the present invention. Shown is a tube-like container being closed at one end by a selectively removable tear strip placed within the body of the tube-like structure thereby providing an additional tab-like end portion. The other end being open where through an edible food item can be inserted and the end sealed. Thereby providing a hermetically sealed perishable food container having a variable moisture content, which can be inserted into and encompassed by an outer edible member or said tube-like container can be filled after being encompassed by the outer edible member.

Turning to FIG. 7A, shown therein is a perspective view of an additional embodiment of the present invention 10. Shown is a tube-like container 16 being closed at one end by a selectively removable tear strip 20 placed within the body of the tube-like structure 16 thereby providing an additional tab-like end portion 44. The other end 40 is open where through an edible food item can be inserted and the end sealed. Thereby provided is a hermetically sealed perishable food container 10 having a variable moisture content, which can be inserted into and encompassed by an outer edible member 12 (not shown) or said tube-like container can be filled after being encompassed by the outer edible member 12 (not shown). Closure stripe 42 is formed after filling the jacket 16.

Figure 7B:
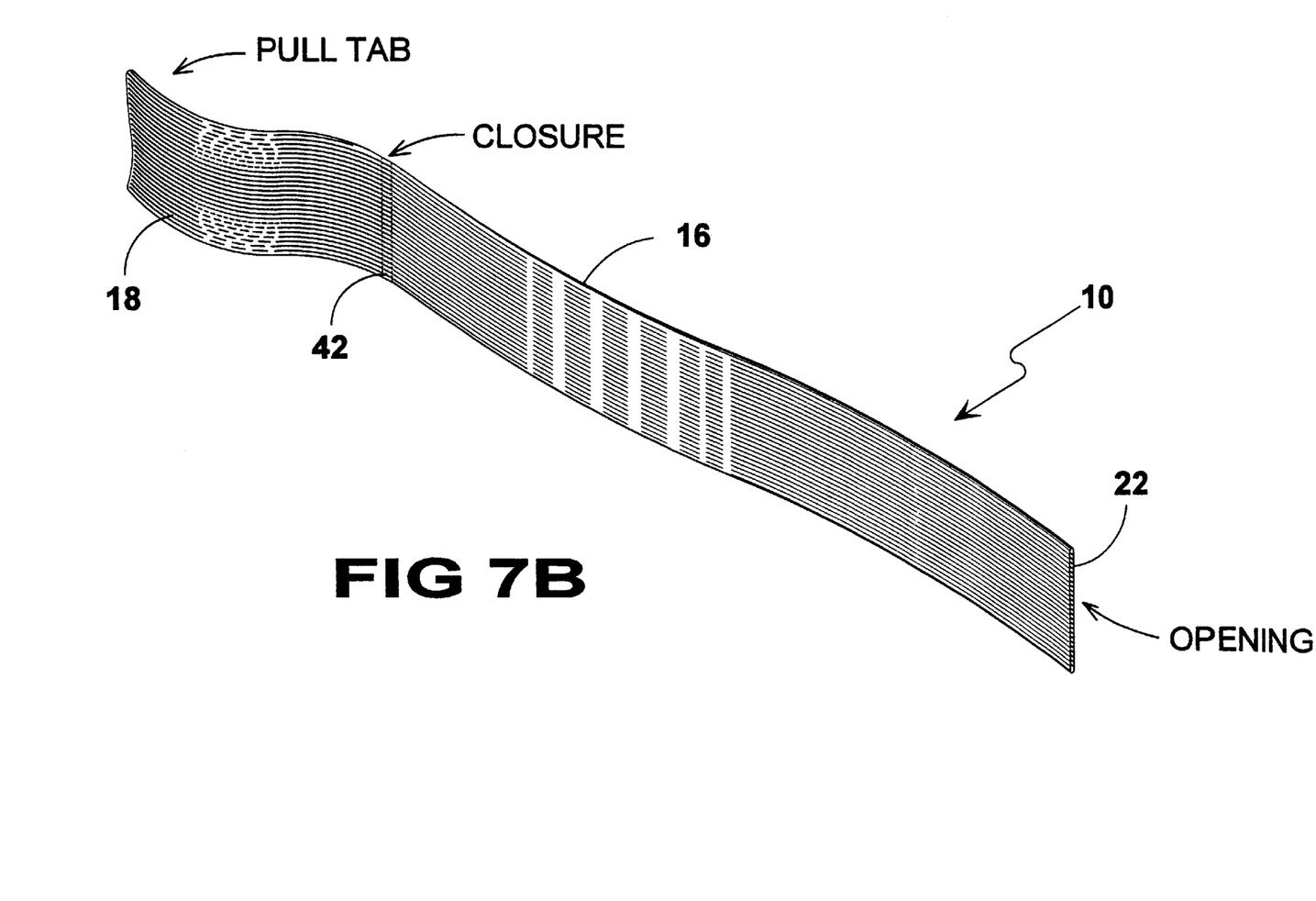
FIG. 7B is a perspective view of an additional embodiment of the present invention. Shown is a tube-like container being closed at one end having a length of material forming a pull tab. The other end being open where through an edible food item can be inserted and the end either left open for display purposes or closed by means of a tie or other such selectively removable member for longer term storage purposes. Thereby providing a hermetically sealed perishable food container having a variable moisture content, which can be inserted into and encompassed by an outer edible member or said tube-like container can be filled after being encompassed by the outer edible member.

Turning to FIG. 7B, shown therein is a perspective view of an additional embodiment of the present invention 10.

Shown is a tube-like container 16 being closed at one end 42 having a length of material forming a pull tab 18. The other end being open 22 where through an edible food item can be inserted and the end 22 either left open for display purposes or closed by means of a tie or other such selectively removable member 28 (not shown) for longer term storage purposes. Thereby provided is a hermetically sealed perishable food container 10 having a variable moisture content, which can be inserted into and encompassed by an outer edible member 12 (not shown) or said tube-like container 16 can be filled after being encompassed by the outer edible member 12 (not shown).

What is claimed to be new and desired to be protected by Letters Patent is set forth in the appended claims.

I claim:

1. A process for assembling and preparing a composite food for consumption comprising the steps of:

a) inserting food filling having a liquid content into a flexible moisture impermeable elongated, inedible tube-like jacket that prior to inserting said food filling was opened at both ends;

b) sealingly closing both ends of said jacket for storage of said food filling within said jacket using a tear strip at one end of said jacket and a tab at the opposite end thereof;

c) placing said food filling containing jacket inside a crisp open ended outer food shell to form a food assembly so that said food filling and said jacket are encircled by said shell and so that each end of said jacket is exposed at each respective end of said outer food shell;

d) storing said food assembly for later use;

e) removing said food assembly from storage and pulling on said tear strip sufficient to break the seal of the jacket to provide a steam vent for said jacket;

f) placing said food assembly in a microwave heating device and heating said food assembly to provide a heated food filling while allowing said jacket to vent through said steam vent;

g) removing said heated food assemble from said microwave heating device;

h) removing said tear strip completely to fully open said one end of said jacket; and, i) pulling said jacket completely out of said outer food shell using said tab while squeezing said closed opposite end of said jacket to discharge the heated food filling from said jacket into said outer food shell thereby providing a composite food having a crisp outer food shell and a heated inner food filling.

* * * * *